March 22, 1949.  J. W. HEATLEY  2,465,227
METHOD OF AND APPARATUS FOR SEEDING GARDENS
Filed Oct. 10, 1944
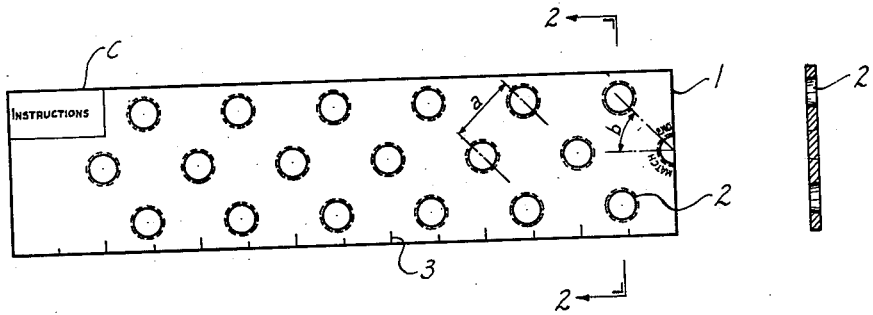
Fig. 1  Fig. 2
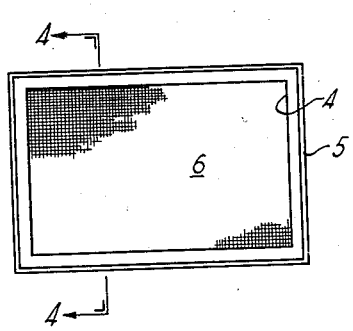
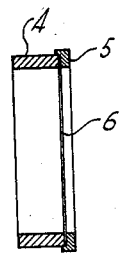
Fig. 3  Fig. 4
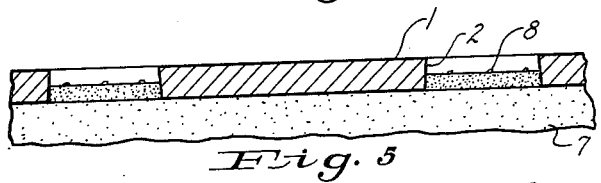
Fig. 5
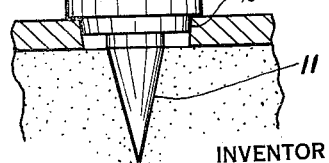
Fig. 6
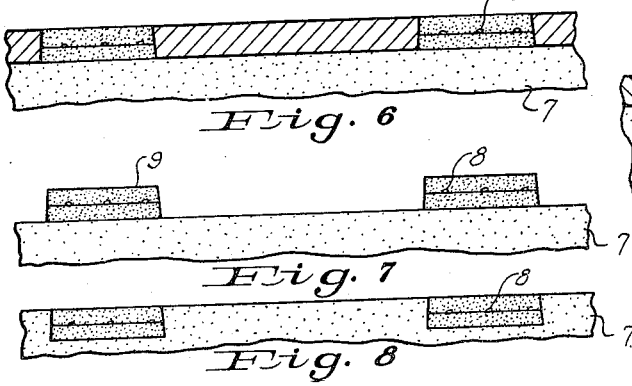
Fig. 7
Fig. 8
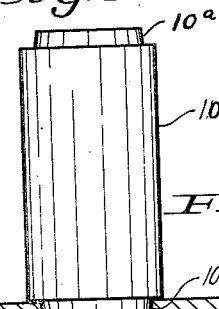
Fig. 9
INVENTOR
James W. Heatley
BY William B Jaspert
ATTORNEY Patented Mar. 22, 1949

2,465,227

UNITED STATES PATENT OFFICE 2,465,227

METHOD OF AND APPARATUS FOR SEEDING GARDENS

James W. Heatley, Pittsburgh, Pa.

Application October 10, 1944, Serial No. 557,986

1 Claim. (Cl. 111—1)

This invention relates to a method of and apparatus for seeding gardens and it is among the objects thereof to provide for the planting of seed of uniform depth and spacing so that the seed will be subjected to substantially identical soil and growing conditions resulting in uniformity of size of plant.

The invention is especially adapted for use in Victory gardens or gardens of small space where it is desired to obtain the maximum output in a minimum of space.

The invention will become more apparent from a consideration of the accompanying drawing constituting a part hereof, in which like reference characters designate like parts, and in which Fig. 1 is a top plan view of a templet in the form of a board having perforations scaled and spaced for the planting of seed or plants in rows;

Fig. 2 a cross sectional view taken along the line 2—2 of Fig. 1;

Fig. 3 a top plan view of a screen box;

Fig. 4 a cross section taken along the line 4—4 of Fig. 3;

Figs. 5 to 8 fragmentary views in cross section illustrating the use of the templet and the manner of seeding the soil in accordance with the principles of this invention; and Fig. 9 a cross sectional view, partially in elevation, of an accessory for gauging the depth of soil and centering plant root holes.

In the drawing the numeral 1 designates a templet made of wood or other suitable material of approximately ½" thickness having perforations or openings 2 of a desirable diameter such as 1¾", the board being provided with graduations 3 scaled to inches, a convenient length of board being approximately 42" with a 12" width. In practice, for the seeding of root plants such as carrots and beets, the perforations 2 are spaced approximately 4¾" in the dimension a and the outer rows are at approximately a 45° angle at b. This results in the proper spacing of the plants and uniformity of rows in transverse directions, leaving ample room for cultivation. A space C is provided at one end of the board for printing schedules and instructions.

In Figs. 3 and 4 is shown a box-shaped screen having side walls 4 and a frame 5 between which a screen 6 of approximately ¼" mesh is secured. The use of the planting templet and screen is illustrated in connection with Figs. 5 to 8 of the drawing, the templet 1 being placed on the soil 7 which has been properly cultivated and prepared for seeding. The box screen 4 is placed on the templet 1 and charged with rich top soil. The screen is worked back and forth along the board to charge the screened soil into the openings 2 of the templet to about half of the depth of the opening, as shown in Fig. 5. The seed 8 is then placed on the soil in suitable spaced relation to each other, and the screening of top soil into the openings 2 is continued until it is level with the top of the templet as shown in Fig. 6. Templet 1 is then removed, leaving cylindrical mounds 9 seeded as shown in Fig. 7, which are then pressed into the ground either by pressure of the foot or by the use of a board or other displacing means as shown in Fig. 8.

By carrying out the steps as shown in Figs. 5 to 8 of the drawing each seed is planted at the same depth and is surrounded with the same texture and quality of top soil so that each seed has the same growing environment resulting in plants of uniform size. I have found that carrots or beets planted in this manner result in plants so uniform as to almost appear identical, and by maintaining the desired relation of the seeding openings 2 in rows as shown in Fig. 1, the planted beds give a uniform and neat appearance and also are easily cultivated.

It is to be noted that the templet openings 2 are chamfered to produce mounds of frusto-conical shape which prevents the breaking away of the edges of the mounds when the templet is removed from the soil as in Figure 7.

If exact dimensions of soil depth are to be carried out, a flanged block 10, such as shown in Fig. 9, may be employed with a constricted end 10a to press the soil to the halfway dimension as shown in Fig. 5. The depressed soil is then seeded as shown in Fig. 5 and additional soil is supplied to fill the seed openings 2 as shown in Fig. 6.

The templet 1 may also be employed for transplanting top root vegetable plants by utilizing a dowel 11 (Fig. 9) which is centered. By placing the shoulder 10b in the openings 2 and depressing the dowel 11 a suitable opening is made in which to insert the plant so that all plants are uniformly spaced. The dowel 11 may also be marked or flanged to provide uniform depth of the root opening which again results in uniformity in the root structure and the resultant plant growth.

It is evident from the foregoing description of this invention that seed planting carried out in accordance therewith results in economy of space, saves labor, increases yield and insures uniformity in size of the plants. It also very materially enhances the appearance of the garden and is an inducement to plant propagation by home owners.

Although one embodiment of the invention has been herein illustrated and described, it will be evident to those skilled in the art that various modifications may be made in the details of construction without departing from the principles herein set forth.

I claim:

The method of seeding gardens and the like which comprises preparing the soil to a relatively fine texture, placing a templet thereon having perforations extending therethrough and spaced in transverse rows, charging screened top soil in the perforations of the templet to fill the same, pressing the soil in the perforations to approximately half of the depth of the perforations, placing a seed on the surface of the screened and pressed soil in the perforations of said templet, charging additional screened soil in the templet openings to cover the seed to the top of said openings, removing the templet leaving the seed in mounds corresponding to the periphery and depth of the seeding templet, and pressing said mounds into the soil to thereby obtain uniformity of depth of seeding.

JAMES W. HEATLEY.

REFERENCES CITED

The following references are of record in the file of this patent:

UNITED STATES PATENTS

| Number | Name | Date |
|---|---|---|
| 500,476 | Douthit | June 27, 1893 |
| 979,175 | Lapham | Dec. 20, 1910 |
| 1,183,653 | Kring | May 16, 1916 |
| 1,592,250 | Yerkes | July 13, 1926 |
| 1,735,835 | McCallum | Nov. 12, 1929 |
| 2,039,442 | Mulford | May 5, 1936 |

FOREIGN PATENTS

| Number | Country | Date |
|---|---|---|
| 250,299 | Great Britain | Nov. 4, 1926 |